Dec. 10, 1963 J. W. DICKEY Re. 25,493
METHOD OF AND AN APPARATUS FOR FORMING LAMINATED STRUCTURE OF ADHERED MATERIALS
Original Filed Sept. 23, 1957
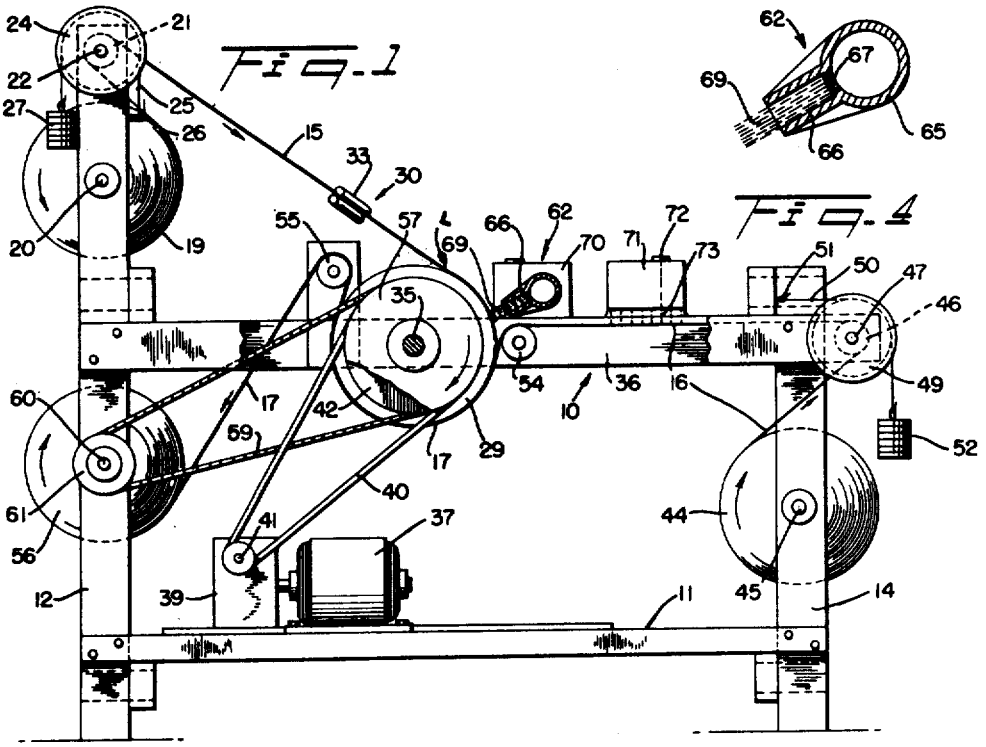
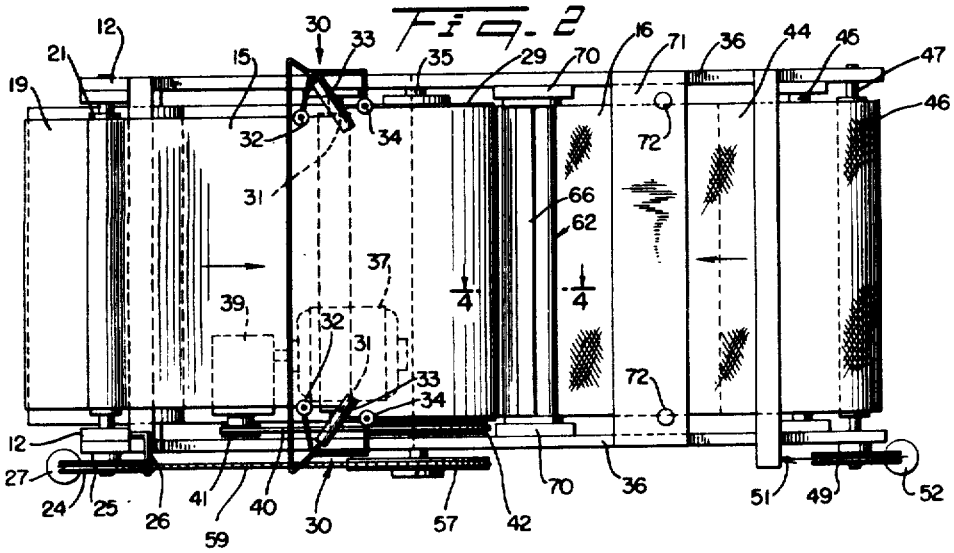
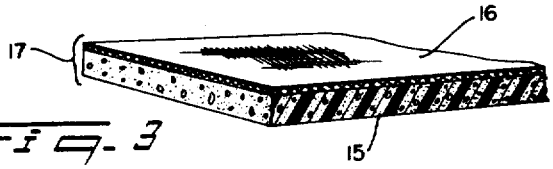
INVENTOR
JOHN W. DICKEY
BY Robertson & Sneyth
ATTORNEYS United States Patent Office Re. 25,493
Reissued Dec. 10, 1963

25,493

METHOD OF AND AN APPARATUS FOR FORMING LAMINATED STRUCTURE OF ADHERED MATERIALS

John W. Dickey, Esmont, Va., assignor, by mesne assignments, to Reeves Brothers, Inc., New York, N.Y., a corporation of New York Original No. 3,057,766, dated Oct. 9, 1962, Ser. No. 685,675, Sept. 23, 1957. Application for reissue Jan. 18, 1963, Ser. No. 253,023
13 Claims. (Cl. 156—82)

Matter enclosed in heavy brackets [ ] appears in the original patent but forms no part of this reissue specification; matter printed in italics indicates the additions made by reissue.

This invention relates to a method of and an apparatus for forming a composite structure of adhered laminated materials, and particularly relates to a method and an apparatus for forming a laminated structure including a layer of an elastic flexible foamed material and a layer of flexible relatively inelastic material adhered thereto.

The invention has among its objects the provision of a novel improved method of and an apparatus for forming laminated adhered materials.

A further object of the invention resides in the provision of a method and an apparatus of the character indicated which avoids the formation of wrinkles in either the elastic or the relatively inelastic layer of the material and which produces a stronger more durable bond between the adhered layers.

Further objects of the invention lie in the provision of an improved method of and an apparatus for forming laminated adhered materials wherein the adhesive bond is formed by heating a foamed thermoplastic surface on at least one layer, the method and apparatus being particularly characterized by the application of uniform pressure between the layers over larger areas and for substantial lengths of time, so that the layers may adjust themselves to stable bonded positions.

Another object is to provide for the preheating of the relatively inelastic layer of material so that unwanted chilling of the melted thermoplastic surface is avoided before the layers are securely bonded.

Still other objects of the invention reside in the separate control of the temperatures of the surface of the layers to be bonded, and the provision of full control over both layers, including the tensions therein, immediately prior to and at the bonding or laminating zone.

The above and further objects and novel features of the invention will more fully appear from the following description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIGURE 1 is a somewhat schematic view in side elevation of an illustrative embodiment of apparatus made in accordance with the invention, certain of the parts of such apparatus being shown partially broken away for clarity of illustration;

FIGURE 2 is a view in plan of the apparatus of FIGURE 1;

FIGURE 3 is a view in perspective of a laminated structure produced by the apparatus and method of the invention; and FIGURE 4 is a view in vertical transverse section through the means for heating the bonding surface of the flexible elastic web material, the second being taken along the line 4—4 of FIGURE 2.

This invention represents an improvement upon the invention disclosed and claimed in my prior application Serial No. 612,692, filed September 28, 1956, now Patent 2,957,793, which is concerned with the adhesive bonding of a flexible elastic foamed web material to a backing or reinforcing layer or web of material such as cloth and the like. The flexible elastic foamed web material particularly described is a foamed resin plastic material, for example, polyurethane plastic. The composite product composed of such flexible plastic web material and the backing or reinforcing web is useful, for example, as a carpet underlay or as a garment lining, as fully set forth in said prior application.

It has been found that the apparatus and method of my prior application require somewhat close control to produce a satisfactory bond between the webs, and maintain the layers of the product free from wrinkles. The apparatus and method of the present invention provide a much longer bonding or laminating zone in which the layers are thrust against each other whereby to adhere them together, provides for the better control of the temperature of the thermoplastic surface of the elastic foamed web to be bonded, and effectively separates the preliminary conditioning of the bonding surface of the backing or reinforcing layer from the heating of the thermoplastic material of the elastic web.

There is shown in the drawing herein one embodiment of apparatus whereby the method of the present invention may be practiced. Such apparatus has a frame in the form of a table having an upper horizontal platform 10 and a lower horizontal platform 11, such platforms being supported by pairs of legs or uprights 12 and 14 which are connected by cross members, as shown in FIGURE 2. The apparatus provides, in a manner to be described, for the controlled feeding of a web of flexible elastic foamed material 15 to an elongated laminating zone on a laminating drum 29, separately conditioning the bonding surface of web 15 immediately in advance of the laminating zone, feeding a web 16 of backing or reinforcing fabric to such laminating zone, separately heating the confronting bonding surface of web 16, and removing the resulting laminated product from the exit end of the laminating zone.

A supply roll 19 of web 15 is supported on a central arbor 20 which is journalled in upright members 12 adjacent the upper guide roller 21 mounted on a cross shaft 22, which is journalled in members 12 above roll 19. The run of the web 15 between guide roller 21 and the laminating drum 29 may be placed under suitable tension, which stretches it longitudinally somewhat, by an adjustable retarding means acting upon roller 21. In the embodiment shown, such retarding means takes the form of a brake drum 24 affixed to one end of shaft 22 and a brake strap 25 frictionally engaging the brake drum. One end of strap 25 is secured to a bracket 26 mounted on the frame of the apparatus. The other freely hanging end of the strap is provided with an adjustable weight 27, so that the retarding friction upon roller 22 may be varied as required. In practice when laminating foamed plastic with some fabrics, it has been found that the best lamination occurs when the web 15 is tensioned only enough to have it lay wrinkle-free on the drum 29.

In its travel from its roller 22 to drum 29 the web 15 may be guided for accurate edge alignment. To accomplish this, the apparatus may be provided with web-controlling means conventional in the textile art. In the drawing there is shown somewhat schematically an edge-guiding device, generally designated 30, of the type known as the "Mount Hope Precision Guider," made and sold by the Mount Hope Machinery Company, Taunton, Massachusetts. Such device operates both to edge-guide the web and when necessary to tension it so as to stretch it somewhat laterally as it travels toward and into engagement with drum 29. Alternatively, there may be employed separate means for edge-guiding the web is combination with a conventional web expander, such as a Vari-Bow "Free-Wheeling" expander, also made by the Mount Hope Machinery Company. The result of using either of the above disclosed web expanders is to pull the edges of the web laterally outwardly at the location of the expander, the web continuing to travel in its laterally stretched condition to and partially around the laminating drum 29. In FIGURE 2 the web 15, as shown being acted upon by the skewed rolls 33 of a "Precision Guider," is stretched outwardly in a zone 31 extending from rolls 33 to the edge-engaging rolls 34 of the guider.

The laminating drum 29 is mounted upon a transverse shaft 35 journalled in the side frame members 36 of the upper platform 10. Drum 29 is driven by an electric motor 37 through the medium of a speed reducer means 39. A driving belt 40, entrained over the driving pulley 41 of the speed reducer and the larger pulley 42 affixed to shaft 35, drivingly connects the motor and the drum. Drum 29 is preferably cooled, as by the circulation of cooling fluid such as water therewithin by means not shown, so as to prevent a progressive rise in the temperature of the drum. The cooling fluid may be thermostatically controlled, if desired.

The backing or reinforcing web 16 is fed from a supply roll 44 mounted on an arbor 45, which is journalled between upright frame members 14. Upon leaving roll 44, web 16 runs up and partially around a horizontal guide roller 46 which is journalled in the frame at the platform 10. Upon leaving roller 46, web 16 travels horizontally to a second guide roller 54, likewise journalled between the sides of platform 10. Roller 54 is preferably so located, for reasons given hereinafter, that the surface thereof adjacent drum 29 is spaced from the surface of the drum in an amount at least slightly greater than the combined thicknesses of web 15 and 16.

Web 16 is suitably tensioned longitudinally in the run thereof extending from roller 46 to and around the laminating drum 29. Such tensioning of the web is effected by a retarding means including a brake drum 49 affixed to shaft 47 which carries rollrer 46, and a suitably weighted brake strap 50 which engages the brake drum. As shown, one end of strap 50 is affixed to the frame at 51, and the other, freely hanging end of the strap carries an adjustable weight 52. It will be seen from the above that each of webs 15 and 16 may be suitably separately tensioned longitudinally in the runs extending to and partially around the laminating drum to the zone at which the composite product is removed from the drum. Although for simplicity no mechanism is shown for spreading and tensioning web 16 laterally in advance of drum 29, such means, which may be the same as those above described for guiding and stretching web 15, may be provided, if desired, so as to engage the horizontal run of the web in advance of roller 54.

It will be seen that, in the embodiment shown, web 15 first engages the peripheral surface of drum 29, at a zone L markedly above the horizontal diameter thereof, and that the web 16 first engages web 15 on the drum 29 at a location approximately at the horizontal diameter. The run of the web 15 on drum 29 in advance of the zone of first contact L and the run of web 16 down the side of roller 54 may be said to form an upright V with each other, such V being of small apex angle. Such configuration and orientation of the webs as they approach each other is of advantage for a number of reasons, one of which is that it allows the outer bonding surface of web 15 on the drum to be subjected to heat [immediately in advance of the zone L] *at a position outwardly and lower than and arcuately removed from, the first point of peripheral contact of the web 15 with the drum to thus render adhesive the outward surface of the web 15 during the first part of its peripheral travel* without appreciably heating the upper bonding surface of web 16.

A suitable means 62 for thus heating the bonding surface of web 15 is in the form of a transverse nozzle-type gas heater.

As shown, heater 62 has a transverse pipe 65 to which there may be fed a suitable mixture of combustible gas and oxygen. A downwardly sloping elongated nozzle 66 has its outer end positioned above roller 54 and close to the surface of the run of web 15 on the drum 29. The gas issues from pipe 65 through a plurality of orifices 67 into the nozzle, where it is ignited to form a flame 69 which plays upon the surface of web 15 *to thus direct intense heat in a narrow band across the extent of the drum 29*. Such placement of the nozzle, while effectively heating the bonding surface of web 15, avoids any substantial heating of web 16, due to the inherent tendency of the heated products of combustion to rise and thus to flow away from the run of web 16 passing down the side of roller 54 toward zone L.

In order to provide for the preheating of the upper surface of web 16 there may be employed a heating device 71 which cooperates with web 16 in its travel toward roller 54. In the embodiment shown heater 71 is in the form of an elongated casing positioned transversely of the apparatus on platform 10. Heater 71 may be of the electrically heated air blast type, the casing containing electrical resistance units (not shown). Air under pressure is introduced to the casing through inlet openings 72, and after having been heated, is discharged as shown at 73 against the upper side of web 16. Heating means 62 and 71, being thus spaced from each other and separately energized, may be separately controlled by conventional means, not shown, so that the confronting surface of web 15 is heated to the optimum bonding temperature and the confronting surface of web 16 is heated to the desired temperature to [avoid] *temperature condition the web to minimize* chilling of the heated surface of web 15 and to obtain the best bonding with web 15.

The composite laminated product 17, consisting of the bonded layers 15 and 16, travels peripherally about the surface of driven drum 29 for an extent which, in the embodiment shown, somewhat exceeds 180°. Product 17 is removed from drum 29 by travel over an exit guide roller or drum 55 and thence to a driven take-up winding roll 56. Roll 56 is mounted on a shaft 60 journalled in the uprights 12, and is driven through the medium of a belt 59 which is entrained over a pulley 61 affixed to shaft 60 and a pulley 57 affixed to shaft 35. In order to compensate for the varying diameter of the roll 56 upon which material 17 is wound, belt 59 is of such character that it may slip as required upon pulleys 57 and 61. The diameters of such pulleys have such relationship that roll 56 has at all times a peripheral speed exceeding that of drum [39] *29*. As a consequence, the material 17 in its travel around drum 29 is constantly maintained under tension.

*Thus, the effect of the action of roll 55 is to assist in maintaining the first material 15 and second material 16 in tension as they are joined on the periphery of the drum 29 for a further portion of its arcuate travel to cause the joined materials to become fully adjusted during the setting of the adhesive surface of the web material 15.* It will be understood that other known means may be employed to drive shaft 60 so that the material 17 approaching the roll 56 is constantly maintained under substantially constant tension at all times.

The laminated product 17 resulting from practice of the method and use of the apparatus of the invention is characterized by its uniformity, the strength of the bond between layers 15 and 16, and by the freedom of both such layers from wrinkles. Web 15 approaches drum 29 under longitudinal tension, and also preferably under lateral tension, so that it is stretched somewhat longitudinally and, in accordance with the illustrative embodiment, also stretched laterally. The web 15 retains such stretched condition in its travel around drum 29, due to the frictional engagement between the web and the drum. The web 15 thus lies smoothly upon the surface of the drum, and is in condition to be bonded smoothly and evenly to the web 16. Web 16 is in uniformly spread-out, tensioned condition when it first contacts the web 15. Throughout the extended laminating zone, which in the embodiment shown occupies over half the peripheries of drum 29 and roller 55, webs 15 and 16 continue to be pressed uniformly together, whereby the webs are bonded together in their tensioned conditions. The extended length of the laminating zone affords time, before the adhesive surface of web 15 has become fully set, for the adjustment of one web relative to the other, and for the setting of the adhesive bond between the webs to a strong condition.

The method and apparatus of the present invention are of advantage because of their simplicity of control, and because they produce a composite laminated product which is substantially uniform in its excellence of bonding between layers and which is free of wrinkles. The heating of the bonding surface of the web of elastic foamed resin tends to expand it and thus results in wrinkling of such web during the laminating process. When said web is placed under tension on the drum 29 in the manner disclosed, its tendency to wrinkle is eliminated. The method and apparatus of the invention may allow the elimination of any roll or rolls to compress the composite laminated product to effect a bonding between the layers thereof, since such compressive force is exerted by the portion of reinforcing layer 16 which travels about drum 29. Drum 29 is contacted only by the rear, unheated surface of web 15, and so there is no tendency for the drum to become coated with the material of web 15. Thus the apparatus can run continuously for long periods, producing a continuous length of composite product, without the necessity of stopping the apparatus to clean it.

Although only a limited number of embodiments of the invention have been illustrated in the accompanying drawings and described in the foregoing specification, it is to be expressly understood that various changes, such as in the relative dimensions of the parts, materials used, and the like, as well as the suggested manner of use of the apparatus of the invention, may be made therein without departing from the spirit and scope of the invention as will now be apparent to those skilled in the art. [Thus although in the apparatus disclosed the bonding surface of web 15 is rendered adhesive by being heated, in some instances one or both of the confronting surfaces of webs 15 and 16 may, as an alternative to the heating of the bonding surface of web 15, be rendered adhesive in advance of the laminating zone by the application thereto of a separate suitable adhesive material as by spraying or roller coating it on such surface or surfaces.]

What is claimed is:

1. In a method of laminating a markedly flexible and elastic foamed first material to a flexible backing second material by rendering a surface of the markedly flexible material adhesive by the application of heat prior to joining said materials, the improvement comprising preheating the confronting surface of said second material prior to its contact with the adhesive surface of said first material, said preheating being carried to a point where said second material is temperature conditioned to minimize chilling of said adhesive surface.

2. In an apparatus for laminating a markedly flexible foamed plastic first material to a flexible backing second material by rendering a surface of the foamed material adhesive by the application of heat prior to joining said materials, the improvement comprising a horizontal rotatable driven drum, means for downwardly feeding said first material onto and at least partly around the periphery of said horizontal rotating drum, heating means for directing intense heat in a narrow band across the extent of said drum at a position outwardly and lower than the first point of peripheral contact of said first material to render adhesive the outward surface of said first material during the first part of its arcuate peripheral travel, guide means for contacting the two materials at a point lower than and arcuately removed from the said band of application of heat to said first material and means to maintain said first and second materials in tension as they are joined on the periphery of said drum for a further portion of its arcuate travel to cause the joined materials to become fully adjusted during the setting of the adhesive.

3. Apparatus according to claim 2 where the heating means applies the heat to the foamed plastic immediately prior to its contact with the second material.

4. Apparatus according to claim 2 comprising means for cooling said drum.

5. Apparatus according to claim 2 in which said last named means comprises in part a guide roller adapted to receive the laminated materials from said drum and to pass said materials partially around said roller.

6. In a method of laminating a markedly flexible and elastic foamed first material to a flexible backing second material by rendering a surface of the markedly flexible material adhesive by the application of heat prior to joining said materials, the improvement comprising downwardly feeding said first material onto and at least partly around the periphery of a horizontal rotating drum in frictional engagement therewith, directing intense heat in a narrow band across the extent of said drum to render adhesive only the outward surface of said first material during the first part of its peripheral travel and at a position outwardly and lower than the first point of peripheral contact of said first material, laminating said first and second materials by contacting said adhesive surface with the second material during said peripheral travel, the two materials being brought into contact along a line arcuately removed from said band of application of heat to said first material and thereafter maintaining the laminated materials under longitudinal tension to urge the same against the drum while said materials are becoming adjusted and the adhesive is setting.

7. The method of claim 6 wherein the foamed material is fed onto said drum under some longitudinal tension.

8. The method of claim 6 wherein said second material is under longitudinal tension during lamination.

9. The method of claim 6 where the two materials are caused to come together for contact along paths generally forming an upright narrow V, and where heat is directed upon said first material near the apex of the V in a direction away from the confronting surface of said second material.

*10. In an apparatus for laminating a markedly flexible foamed plastic first material to a flexible backing second material by rendering a surface of the foamed material adhesive by the application of heat prior to joining said materials, the improvement comprising a rotatable driven drum, means for feeding said first material onto and at least partly around the periphery of said rotating drum, heating means for directing intense heat in a narrow band across the extent of said drum at a position arcuately removed from the first point of peripheral contact of said first material to render adhesive the outward surface of said first material during the first part of its arcuate peripheral travel, guide means for contacting the two materials at a point arcuately removed from the said band of application of heat to said first material and means to maintain said first and second materials in longitudinal tension as they are joined on the periphery of said drum for a further portion of its arcuate travel to cause the joined materials to become fully adjusted during the setting of the adhesive.*

*11. In a method of laminating a markedly flexible and elastic foamed first material to a flexible backing second material by rendering a surface of the markedly flexible*

*material adhesive by the application of heat prior to joining said materials, the improvement comprising feeding said first material onto and at least partly around the periphery of a rotating driven drum in frictional engagement therewith, directing intense heat in a narrow band across the extent of said drum to render adhesive only the outward surface of said first material during the first part of its peripheral travel and at a position arcuately removed from the first point of peripheral contact of said first material, laminating said first and second materials by contacting said adhesive surface with the second material during said peripheral travel, the two materials being brought into contact along a line arcuately removed from said band of application of heat to said first material and thereafter maintaining the laminated materials under longitudinal tension to urge the same against the drum while said materials are becoming adjusted and the adhesive is setting.*

*12. The method of claim 6 where the two materials are caused to come together for contact along paths generally forming a narrow* V, *and where heat is directed upon said first material near the apex of the* V *in a direction away from the confronting surface of said second material.*

*13. In a method of laminating a markedly flexible and elastic foamed first material to a flexible backing second material by rendering a surface of the markedly flexible material adhesive by the application of heat prior to joining said materials and where the heated surface of said foamed material is subject to wrinkling only on the surface heated, the improvement comprising feeding said foamed first material onto and at least partly around the periphery of a rotating driven drum in frictional engagement therewith, cooling said drum, and directing intense heat in a narrow band across the extent of said drum*

*onto the foamed first material to render adhesive only the outward surface of said foamed first material during its peripheral travel and at a position arcuately removed from the first point of peripheral contact of said first material, and laminating said first and second materials by contacting said heated adhesive surface with the second material while the heated foam material is on said cooled drum and during said peripheral travel.*

References Cited in the file of this patent or the original patent

UNITED STATES PATENTS

| | | |
|---|---|---|
| 2,259,362 | Young | Oct. 14, 1941 |
| 2,488,212 | Lloyd | Nov. 15, 1949 |
| 2,584,002 | Elser et al. | Jan. 29, 1952 |
| 2,594,229 | Snyder et al. | Apr. 22, 1952 |
| 2,628,654 | Alderfer | Feb. 17, 1953 |
| 2,632,921 | Kreidl | Mar. 31, 1953 |
| 2,639,252 | Simon et al. | May 19, 1953 |
| 2,642,920 | Simon et al. | June 23, 1953 |
| 2,698,272 | Clapp et al. | Dec. 28, 1954 |
| 2,714,571 | Irion et al. | Aug. 2, 1955 |
| 2,740,741 | Vaughan et al. | Apr. 3, 1956 |
| 2,740,743 | Pace | Apr. 3, 1956 |
| 2,746,898 | Buckwalter et al. | May 22, 1956 |
| 2,753,276 | Brochhagen et al. | July 3, 1956 |
| 2,759,475 | Van Swaay | Aug. 21, 1956 |
| 2,878,153 | Hacklander | Mar. 17, 1959 |
| 2,957,793 | Dickey | Oct. 25, 1960 |
| 3,062,698 | Aykanian | Nov. 6, 1962 |

FOREIGN PATENTS

| | | |
|---|---|---|
| 167,675 | Australia | May 14, 1956 |